United States Patent
Sakai et al.

(10) Patent No.: US 11,303,168 B2
(45) Date of Patent: Apr. 12, 2022

(54) ROTOR OF ROTARY ELECTRIC MACHINE

(71) Applicant: MEIDENSHA CORPORATION, Tokyo (JP)

(72) Inventors: Tamotsu Sakai, Yamanashi (JP); Akihumi Shimizu, Fuefuki (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 17/422,856

(22) PCT Filed: Sep. 11, 2019

(86) PCT No.: PCT/JP2019/035617
§ 371 (c)(1),
(2) Date: Jul. 14, 2021

(87) PCT Pub. No.: WO2020/148939
PCT Pub. Date: Jul. 23, 2020

(65) Prior Publication Data
US 2022/0045561 A1    Feb. 10, 2022

(30) Foreign Application Priority Data

Jan. 18, 2019  (JP) .............................. JP2019-006743

(51) Int. Cl.
*H02K 1/27* (2006.01)
*H02K 1/28* (2006.01)

(52) U.S. Cl.
CPC .................. *H02K 1/27* (2013.01); *H02K 1/28* (2013.01)

(58) Field of Classification Search
CPC ............... H02K 1/27; H02K 1/28; H02K 5/00
See application file for complete search history.

(56) References Cited

U.S. PATENT DOCUMENTS

2007/0103023 A1*  5/2007  Tapper ................. H02K 1/2773
                                                  310/156.19
2007/0290565 A1*  12/2007  Mizutani ............... H02K 1/276
                                                  310/156.55

FOREIGN PATENT DOCUMENTS

| JP | 2005-318785 A | 11/2005 |
| JP | 2012-249416 A | 12/2012 |
| JP | 2013-158076 A | 8/2013 |

(Continued)

OTHER PUBLICATIONS

Japanese Notice of Reasons for Refusal and English Translation, Application No. 2019-006743, dated Nov. 22, 2019, 8 pages.

*Primary Examiner* — Thomas Truong
(74) *Attorney, Agent, or Firm* — Foley & Lardner LLP

(57) ABSTRACT

A rotor for a rotary electric machine includes: a rotational shaft that is made of an iron-based metal, and includes a flange; a cylindrical rotor core that is made of a magnetic material, and includes a slot axially extending through the rotor core; a permanent magnet inserted in the slot; an annular first end plate that is made of a non-magnetic material, is shrink-fitted or press-fitted to the rotational shaft, and closes an opening of the slot; an annular fixing plate that is made of an iron-based metal, is shrink-fitted or press-fitted to the rotational shaft, and is disposed radially innerly with respect to the slot; an annular second end plate that is made of a non-magnetic material, includes a recession containing the fixing plate, and closes an opening of the slot; and a fixing tool coupling the second end plate to the fixing plate.

2 Claims, 3 Drawing Sheets

(56) References Cited

FOREIGN PATENT DOCUMENTS

| JP | 2015-226368 A | 12/2015 |
| JP | 2017-158408 A | 9/2017 |
| JP | 2018-88748 A | 6/2018 |
| JP | 2018-137867 A | 8/2018 |
| JP | 6430058 B1 | 11/2018 |

* cited by examiner

ROTOR OF ROTARY ELECTRIC MACHINE

TECHNICAL FIELD

The present invention relates to a rotor for a rotary electric machine such as an electric generator or an electric motor.

BACKGROUND ART

Patent Document 1 cited below discloses a rotor for a rotary electric machine such as a generator or a motor. The rotor disclosed in Patent Document 1 includes: a rotational shaft that is made of an iron-based metal such as a cast iron, and includes a first end including a flange; a rotor core that is composed of a lamination of annular plates made of a magnetic metal such as an iron-based metal, and includes slots formed to axially extend through the rotor core and arranged circumferentially, and is coaxially fitted to the rotational shaft; permanent magnets respectively inserted in the slots of the rotor core; a pair of annular end plates that are made of a non-magnetic metal such as an aluminum-based metal, and are coaxially fitted to the rotational shaft so as to sandwich the rotor core from both axial sides and close openings of the slots of the rotor core; and an annular collar that is made of an iron-based metal, and is fitted to the rotational shaft by shrink fitting so as to be in contact with an end face of one of the end plates.

In the rotor for rotary electric machine according to Patent Document 1, the end plates made of a non-magnetic material such as an aluminum-based metal is greater in linear expansion coefficient than the rotational shaft made of an iron-based metal such as a cast iron. Accordingly, in view of thermal expansion due to heat generation during operation, the rotor includes a gap between the rotational shaft and each of the end plates. Meanwhile, the collar made of an iron-based metal substantially equal to the rotational shaft in linear expansion coefficient is fitted to the rotational shaft by shrink fitting. This causes the collar and the flange of the rotational shaft to axially tighten and fix the rotor core and the end plates.

In the rotor for rotary electric machine according to Patent Document 1, the above described gaps between the rotational shaft and the end plates are likely to allow the end plates to radially move depending on operational conditions such as temperature and rotational speed, which may cause jolts, abnormal noises, etc.

In view of the foregoing, it is desirable to provide a rotor for a rotary electric machine which is structured to suppress jolts, abnormal noises, etc. due to radial movement of end plates.

PRIOR ART DOCUMENT(S)

Patent Document(s)

Patent Document 1: JP 2005-318785 A
Patent Document 2: JP 2015-226368 A
Patent Document 3: JP 2017-158408 A
Patent Document 4: JP 2018-088748 A

SUMMARY OF THE INVENTION

In view of solving the problems described above, a rotor for a rotary electric machine according to one aspect of the present invention includes: a rotational shaft that is made of an iron-based metal, and includes a flange positioned nearer to a first end of the rotational shaft than to a second end of the rotational shaft; a rotor core that is made of a magnetic material, has a cylindrical shape, is disposed around the rotational shaft so as to be axially nearer to the second end of the rotational shaft than the flange of the rotational shaft, and includes a slot axially extending through the rotor core; a permanent magnet inserted in the slot of the rotor core; a first end plate that is made of a non-magnetic material, has an annular shape, is disposed around the rotational shaft so as to be interposed between an axial second end face of the flange of the rotational shaft and an axial first end face of the rotor core and be in contact with these end faces, has an outer diameter set such that the first end plate closes an opening of the slot of the rotor core, and has an inner diameter set such that the first end plate is fitted to the rotational shaft by shrink fitting or press fitting; a fixing plate that is made of an iron-based metal, has an annular shape, is disposed around the rotational shaft so as to be in contact with an axial second end face of the rotor core, has an outer diameter set such that the fixing plate is disposed in a radially inner region with respect to the slot of the rotor core, and has an inner diameter set such that the fixing plate is fitted to the rotational shaft by shrink fitting or press fitting; a second end plate that is made of a non-magnetic material, has an annular shape, includes an axial first end face including a recession structured to contain the fixing plate, is disposed around the rotational shaft so as to be in contact with the axial second end face of the rotor core, and has an outer diameter set such that the second end plate closes an opening of the slot of the rotor core; and a fixing tool that couples and fixes the second end plate to the fixing plate.

According to another aspect of the present invention, in the rotor described above, the first end plate includes an axial first end face including a depression formed coaxially with the first end plate, wherein the depression of the first end plate radially inwardly decreases in thickness.

According to still another aspect of the present invention, in the rotor described above, the second end plate includes an axial second end face including a depression formed coaxially with the second end plate, wherein the depression of the second end plate radially inwardly decreases in thickness.

According to still another aspect of the present invention, in the rotor described above, the fixing tool is a mounting bolt screwed in the fixing plate through the depression of the second end plate.

According to the above aspects of the present invention, the first end plate is greater than the rotational shaft in linear expansion coefficient, and accordingly falls in force tightening the rotational shaft, upon temperature rise due to operation of the rotary electric machine. However, the first end plate is fitted to the rotational shaft by shrink fitting or press fitting, and does not form a gap with the rotational shaft. Furthermore, the first end plate is pressed onto the flange of the rotational shaft by the rotor core and the fixing plate and thereby sandwiched. This serves to fix the first end plate with respect to the rotational shaft with a sufficient retaining force, and suppress the first end plate not only from moving axially but also from moving radially. Moreover, although the second end plate is greater than the rotational shaft in linear expansion coefficient, the second end plate is coupled and fixed to the fixing plate by the mounting bolt, and thereby suppressed from moving axially and from moving radially. Therefore, the rotor according to the above aspects of the present invention serves to suppress jolts, abnormal noises, etc. due to the radial movement of the first and second end plates.

MODE(S) FOR CARRYING OUT THE INVENTION

The following describes an embodiment of a rotor for a rotary electric machine according to the present invention, with reference to the drawings. However, the present invention is not limited to the following embodiment described with reference to the drawings.

Figure 1:
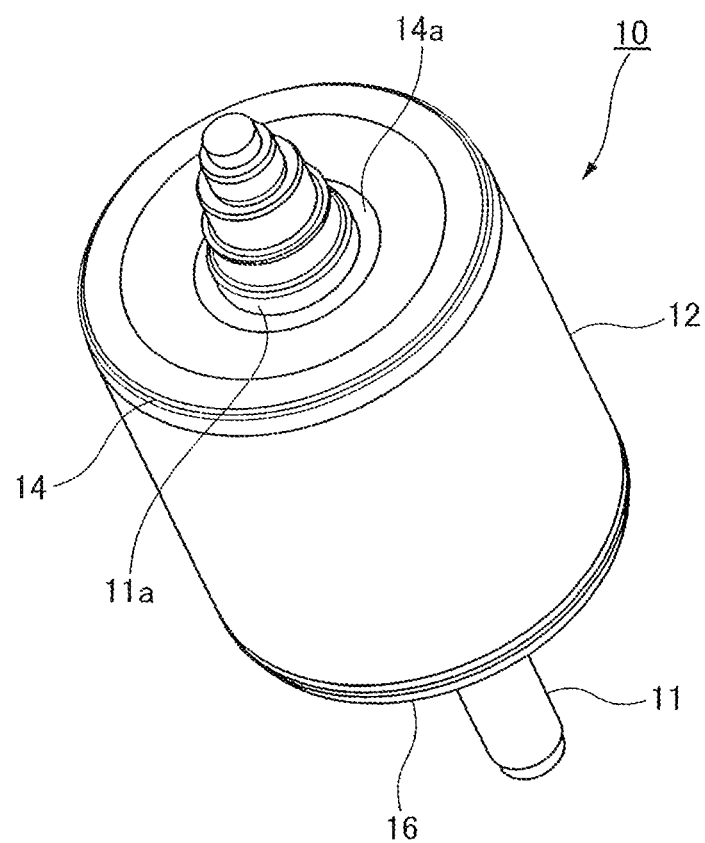
FIG. 1 is an exterior view of a rotor for a rotary electric machine according to the present invention.
Figure 2:
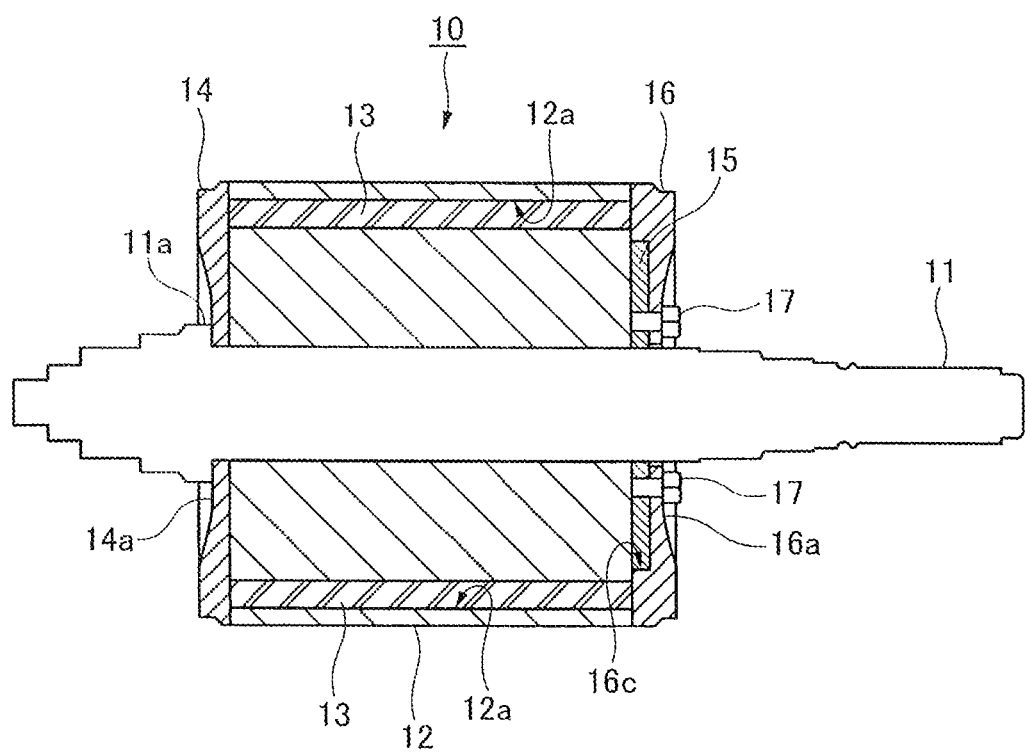
FIG. 2 is a longitudinal sectional view based on FIG. 1.
Figure 3:
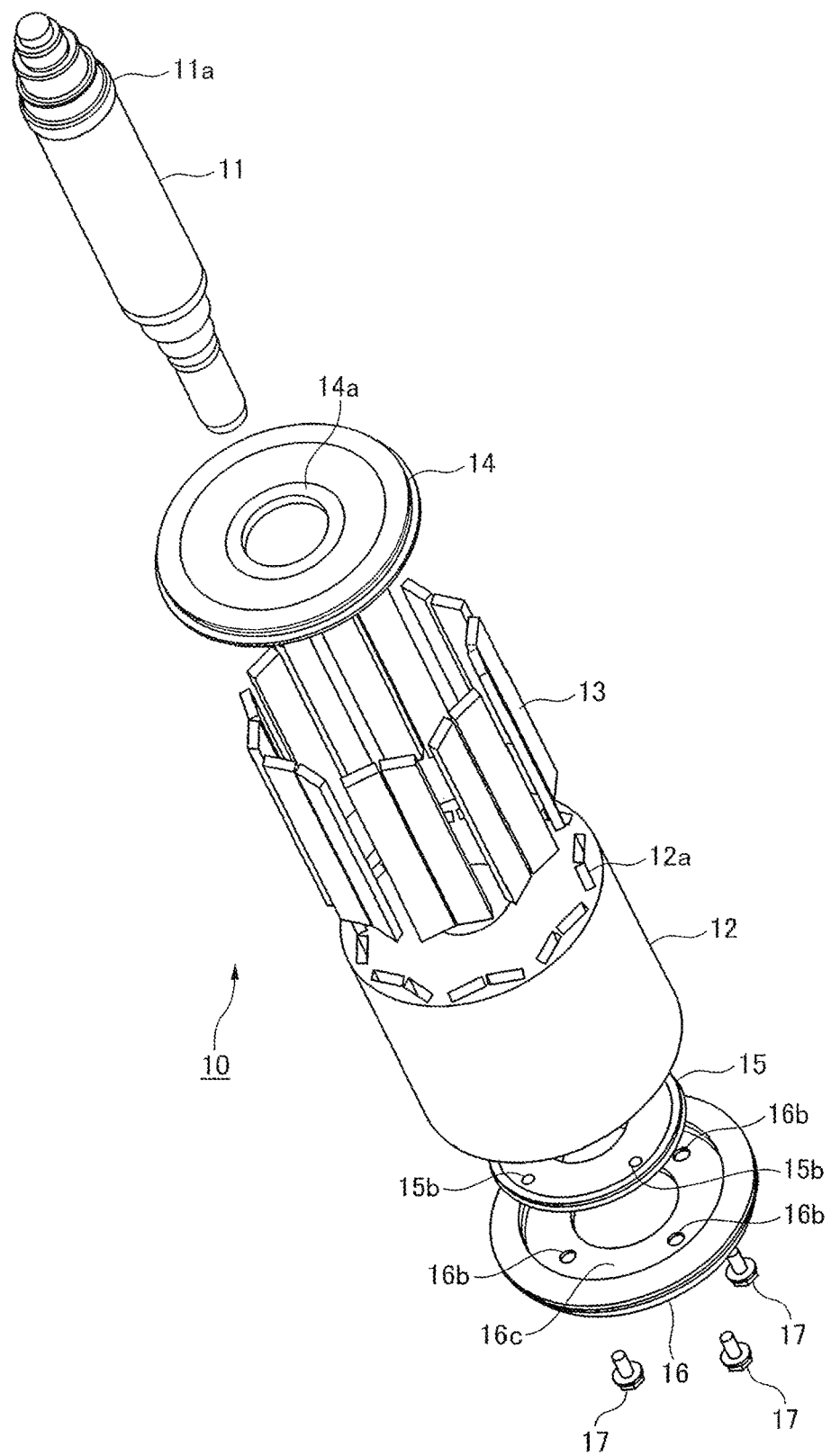
FIG. 3 is an exploded perspective view based on FIG. 1.

[First Embodiment] The following describes the first embodiment of the rotor for the rotary electric machine according to the present invention, with reference to FIGS. 1, 2, and 3.

FIGS. 1, 2, and 3 show a rotational shaft 11, a rotor core 12, permanent magnets 13, a first end plate 14, a fixing plate 15, a second end plate 16, and mounting bolts 17.

The rotational shaft 11 is made of an iron-based metal such as a cast iron, and includes a flange 11a positioned nearer to a first end of the rotational shaft 11 than to a second end of the rotational shaft 11, i.e., nearer to a left end of the rotational shaft 11 in FIG. 2.

The rotor core 12 has a cylindrical shape formed by coaxially laminating a plurality of annular plates made of a magnetic material such as an iron-based metal, and includes slots 12a formed to extend through the rotor core 12 in an axial direction and arranged in a circumferential direction in a vicinity of a radially outer periphery of the rotor core 12. The rotor core 12 is coaxially fitted to the rotational shaft 11 by shrink fitting or press fitting, such that the rotor core 12 is positioned to be axially nearer to the second end (i.e. a right end in FIG. 2) of the rotational shaft 11 than the flange 11a of the rotational shaft 11.

Each of the permanent magnets 13 is inserted in a corresponding one of the slots 12a of the rotor core 12.

The first end plate 14 is an annular plate made of a non-magnetic material such as an aluminum-based metal, and has: an outer diameter substantially equal to an outer diameter of the rotor core 12 such that the first end plate 14 closes openings of the slots 12a of the rotor core 12; and an inner diameter set such that the first end plate 14 is fitted to the rotational shaft 11 by shrink fitting or press fitting. The first end plate 14 is coaxially disposed around the rotational shaft 11 so as to be interposed between an axial second end face (i.e. a right end face in FIG. 2) of the flange 11a of the rotational shaft 11 and an axial first end face (i.e. a left end face in FIG. 2) of the rotor core 12, and be in contact with these end faces.

The first end plate 14 includes a depression 14a having a mortar shape that radially inwardly decreases in thickness. The depression 14a is formed coaxially with the first end plate 14, in a radially inner portion of an axial first end face of the first end plate 14, i.e., an outside end face (a left end face in FIG. 2) of the first end plate 14 in a lamination direction of the annular plates of the rotor core 12.

The fixing plate 15 is an annular plate made of an iron-based metal substantially equal in linear expansion coefficient to the rotational shaft 11 made of an iron-based metal such as a cast iron, and has: an outer diameter set such that the fixing plate 15 is disposed in a radially inner region with respect to the slots 12a of the rotor core 12; and an inner diameter set such that the fixing plate 15 is fitted to the rotational shaft 11 by shrink fitting or press fitting. The fixing plate 15 includes screw holes 15b circumferentially arranged to respectively receive the mounting bolts 17 screwed therein, and is coaxially disposed around the rotational shaft 11 so as to be in contact with an axial second end face (i.e. a right end face in FIG. 2) of the rotor core 12.

The second end plate 16 is an annular plate made of a non-magnetic material such as an aluminum-based metal, and has: an outer diameter substantially equal to the outer diameter of the rotor core 12 such that the second end plate 16 closes openings of the slots 12a of the rotor core 12; and an inner diameter slightly greater than an outer diameter of the rotational shaft 11. The second end plate 16 includes a recession 16c formed in a radially inner portion of an axial first end face (i.e. a left end face in FIG. 2) of the second end plate 16 and structured to contain the fixing plate 15, and is coaxially disposed around the rotational shaft 11 so as to be in contact with the axial second end face (i.e. the right end face in FIG. 2) of the rotor core 12.

The second end plate 16 includes a depression 16a having a mortar shape that radially inwardly decreases in thickness. The depression 16a is formed coaxially with the second end plate 16, in a radially inner portion of an axial first end face of the second end plate 16, i.e., an outside end face (a right end face in FIG. 2) of the second end plate 16 in the lamination direction of the annular plates of the rotor core 12. Furthermore, the depression 16a includes through holes 16b being in communication with the screw holes 15b of the fixing plate 15.

The mounting bolts 17 serving as fixing tools are low-head type screws low in height of head portions. The mounting bolts 17 are screwed in the screw holes 15b of the fixing plate 15 through the through holes 16b of the second end plate 16, and thereby mount, couple, and fix the second end plate 16 to the fixing plate 15.

In the rotor 10 according to the present embodiment, the first end plate 14 is shrink-fitted or press-fitted onto the rotational shaft 11 via and through the axial second end (i.e. the right end in FIG. 2) of the rotational shaft 11, and is fixed at a position such that the depression 14a of the first end plate 14 is in contact with the flange 11a of the axial first end (i.e. the left end in FIG. 2) of the rotational shaft 11. Then, the rotor core 12 is shrink-fitted or press-fitted onto the rotational shaft 11 via and through the axial second end of the rotational shaft 11, and is fixed at a position such that the axial first end face (i.e. the left end face in FIG. 2) of the rotor core 12 is in contact with the first end plate 14. Furthermore, the fixing plate 15 is shrink-fitted or press-fitted onto the rotational shaft 11 via and through the axial second end of the rotational shaft 11, and is fixed at a position such that the fixing plate 15 is in contact with the axial second end face (i.e. the right end face in FIG. 2) of the rotor core 12.

Next, the permanent magnets 13 are inserted into the slots 12a of the rotor core 12. The second end plate 16 is putted onto the axial second end face (i.e. the right end face in FIG. 2) of the rotor core 12 via and through the axial second end (i.e. the right end in FIG. 2) of the rotational shaft 11, such that the fixing plate 15 is positioned inside the recession 16c of the second end plate 16. Subsequently, the mounting bolts 17 are inserted into the through holes 16b of the second end plate 16, and are screwed into the screw holes 15b of the fixing plate 15. In such manner, the rotor 10 is assembled.

According to the above configurations of the rotor 10 of the present embodiment, each of the rotor core 12 and the fixing plate 15 is substantially equal to the rotational shaft 11 in linear expansion coefficient. This allows the rotor core 12 and the fixing plate 15 to be maintained substantially constant in intensity of forces tightening the rotational shaft 11, upon temperature rise due to operation of the rotary electric machine.

The first end plate 14 is greater than the rotational shaft 11 in linear expansion coefficient, and accordingly falls in force tightening the rotational shaft 11, upon the temperature rise. However, the first end plate 14 is fitted to the rotational shaft 11 by shrink fitting or press fitting, and does not form a gap with the rotational shaft 11. Furthermore, the first end plate 14 is pressed onto the flange 11*a* of the rotational shaft 11 by the rotor core 12 and the fixing plate 15 and thereby sandwiched. This serves to fix the first end plate 14 with respect to the rotational shaft 11 with a sufficient retaining force, and suppress the first end plate 14 not only from moving in the axial direction but also from moving in the radial direction.

The second end plate 16 is greater than the rotational shaft 11 in linear expansion coefficient. However, the second end plate 16 is coupled and fixed to the fixing plate 15 by the mounting bolts 17, and thereby suppressed from moving in the axial direction and from moving in the radial direction.

Thus, the rotor 10 according to the present embodiment is structured to suppress the end plates 14 and 16, each of which is greater than the rotational shaft 11 in linear expansion coefficient, from moving in the axial direction and from moving in the radial direction.

Therefore, the rotor 10 according to the present embodiment serves to suppress jolts, abnormal noises, etc. due to the radial movement of the end plates 14 and 16.

Moreover, the depression 14*a* in the axial first end face of the first end plate 14 allows the flange 11*a* to be positioned inside the depression 14*a*. This serves to reduce the rotor 10 in entire length and downsize the rotor 10.

Furthermore, the depression 16*a* in the axial second end face of the second end plate 16 allows the head portions of the mounting bolts 17 to be positioned inside the depression 16*a*. This serves to reduce the rotor 10 in entire length and downsize the rotor 10.

INDUSTRIAL APPLICABILITY

A rotor for a rotary electric machine according to the present invention serves to suppress jolts, abnormal noises, etc. due to radial movement of first and second end plates, and is highly beneficial in view of industrial applicability.

The invention claimed is:

1. A rotor for a rotary electric machine, the rotor comprising:
 a rotational shaft that is made of an iron-based metal, and includes a flange positioned nearer to a first end of the rotational shaft than to a second end of the rotational shaft;
 a rotor core that: is made of a magnetic material; has a cylindrical shape; is disposed around the rotational shaft so as to be axially nearer to the second end of the rotational shaft than the flange of the rotational shaft; and includes a slot axially extending through the rotor core;
 a permanent magnet inserted in the slot of the rotor core;
 a first end plate that: is made of a non-magnetic material; is greater than the rotational shaft in linear expansion coefficient; has an annular shape; is disposed around the rotational shaft so as to be interposed between an axial second end face of the flange of the rotational shaft and an axial first end face of the rotor core and be in contact with these end faces; has an outer diameter set such that the first end plate closes an opening of the slot of the rotor core; and has an inner diameter set such that the first end plate is fitted to the rotational shaft by shrink fitting or press fitting;
 a fixing plate that: is made of an iron-based metal; is substantially equal to the rotational shaft in linear expansion coefficient; has an annular shape; is disposed around the rotational shaft so as to be in contact with an axial second end face of the rotor core; has an outer diameter set such that the fixing plate is disposed in a radially inner region with respect to the slot of the rotor core; and has an inner diameter set such that the fixing plate is fitted to the rotational shaft by shrink fitting or press fitting;
 a second end plate that: is made of a non-magnetic material; is greater than the rotational shaft in linear expansion coefficient; has an annular shape; includes an axial first end face including a recession structured to contain the fixing plate; is disposed around the rotational shaft so as to be in contact with the axial second end face of the rotor core; and has an outer diameter set such that the second end plate closes an opening of the slot of the rotor core; and
 a fixing tool that couples and fixes the second end plate to the fixing plate,
 wherein:
 the first end plate includes an axial first end face including a depression formed coaxially with the first end plate;
 the depression of the first end plate radially inwardly decreases in thickness; and
 the flange of the rotational shaft is positioned inside the depression of the first end plate.

2. A rotor for a rotary electric machine, the rotor comprising:
 a rotational shaft that is made of an iron-based metal, and includes a flange positioned nearer to a first end of the rotational shaft than to a second end of the rotational shaft;
 a rotor core that: is made of a magnetic material; has a cylindrical shape; is disposed around the rotational shaft so as to be axially nearer to the second end of the rotational shaft than the flange of the rotational shaft; and includes a slot axially extending through the rotor core;
 a permanent magnet inserted in the slot of the rotor core;
 a first end plate that: is made of a non-magnetic material; is greater than the rotational shaft in linear expansion coefficient; has an annular shape; is disposed around the rotational shaft so as to be interposed between an axial second end face of the flange of the rotational shaft and an axial first end face of the rotor core and be in contact with these end faces; has an outer diameter set such that the first end plate closes an opening of the slot of the rotor core; and has an inner diameter set such that the first end plate is fitted to the rotational shaft by shrink fitting or press fitting;
 a fixing plate that: is made of an iron-based metal; is substantially equal to the rotational shaft in linear expansion coefficient; has an annular shape; is disposed around the rotational shaft so as to be in contact with an axial second end face of the rotor core; has an outer diameter set such that the fixing plate is disposed in a radially inner region with respect to the slot of the rotor core; and has an inner diameter set such that the fixing plate is fitted to the rotational shaft by shrink fitting or press fitting;

a second end plate that: is made of a non-magnetic material; is greater than the rotational shaft in linear expansion coefficient; has an annular shape; includes an axial first end face including a recession structured to contain the fixing plate; is disposed around the rotational shaft so as to be in contact with the axial second end face of the rotor core; and has an outer diameter set such that the second end plate closes an opening of the slot of the rotor core; and a mounting bolt that couples and fixes the second end plate to the fixing plate, wherein:

the second end plate includes an axial second end face including a depression formed coaxially with the second end plate;

the depression of the second end plate radially inwardly decreases in thickness; and the mounting bolt is screwed in the fixing plate through the depression of the second end plate, and includes a head portion positioned inside the depression of the second end plate.

* * * * *